(12) United States Patent
Mazrolle et al.

(10) Patent No.: US 6,612,261 B2
(45) Date of Patent: Sep. 2, 2003

(54) CANINE TRAINING STRUCTURE

(76) Inventors: James P. Mazrolle, 6 Cushing Rd., Goffstown, NH (US) 03045; Toby R. Mazrolle, 6 Cushing Rd., Goffstown, NH (US) 03045

(*) Notice: Subject to any disclaimer, the term of this patent is extended or adjusted under 35 U.S.C. 154(b) by 0 days.

(21) Appl. No.: 10/062,052

(22) Filed: Jan. 31, 2002

(65) Prior Publication Data

US 2003/0140868 A1 Jul. 31, 2003

(51) Int. Cl.[7] .............................................. A01K 15/02
(52) U.S. Cl. ...................................................... 119/703
(58) Field of Search ................................ 119/702, 703, 119/706

(56) References Cited

U.S. PATENT DOCUMENTS

| | | | |
|---|---|---|---|
| 2,579,797 A | * 12/1951 | Churchfield et al. | 119/28.5 |
| 3,797,461 A | * 3/1974 | Breeden | 119/28.5 |
| 4,497,279 A | * 2/1985 | Bell | 119/706 |
| 5,329,878 A | * 7/1994 | McCauley | 119/165 |
| 5,634,440 A | * 6/1997 | Mogck | 119/706 |
| D420,175 S | 2/2000 | Garrels, Jr. | D30/119 |
| 6,109,213 A | 8/2000 | Rebalko | 119/422 |
| D440,717 S | * 4/2001 | Fazio | D30/119 |
| 6,267,082 B1 | 7/2001 | Naragon et al. | 119/849 |

OTHER PUBLICATIONS

Booklet entitled "Agility Obstacles Manufactured for Pipe Dreams" by Max 2000.
Booklet entitled "Over! Rover Agility Equipment".
Booklet from Steel Tech Industries, RR 1, Box 270, Millerstown, PA 17062—Manufacturer of High Quality Portable Agility Equipment.
MAX 200, 308aframe–contactrrainer–3–8.htm, Jul. 14, 2002, pictures and paragraphs middle of page and below.*

* cited by examiner

Primary Examiner—Charles T. Jordan
Assistant Examiner—Bret Hayes
(74) Attorney, Agent, or Firm—Hayes Soloway P.C.

(57) ABSTRACT

A structure for training and exercising canines is disclosed having a first and a second inclined surface joined at a hingeable joint. The first surface has generally parallel sides and the second surface has a first region having generally parallel sides and a transition region. The transition region having a first dimension corresponding to the dimension of the first surface and a second dimension corresponding to the dimension of the first region.

20 Claims, 3 Drawing Sheets

CANINE TRAINING STRUCTURE

FIELD OF THE INVENTION

The present invention relates to training equipment for canines and more particularly to a climbing structure for agility training.

BACKGROUND OF THE INVENTION

Dog agility began as an exhibition sport in Great Britain, and was imported here in 1977. It was patterned after equestrian events and combines handler control, agility, and confidence. An agility ring is set up with a variety of obstacles. Obstacles include jumps, tunnels, a dog walk, a see-saw or teeter, an A-frame, and weaver poles. The ring is generally square, about 100×100 feet, and fenced off from the spectators. Dogs go through the ring on a leash with a handler (basic agility), or off leash with a guiding handler (advanced agility). They are judged by their ability to correctly negotiate the obstacles in a predetermined order. The dogs are judged primarily by the correctness by which they move on and off the obstacles and by which they stop and stay (on command) on other obstacles. The dogs are secondarily judged by their time in completing the obstacle course. This event requires significant training of both handler and dog.

The A-frame is a triangular shaped structure made up of a pair of symmetric panels 3–4 feet wide and approximately 9 feet long. A hinge typically joins the panels. The height of the A-frame at its peak can be adjusted by changing the length of a chain that couples the lower ends of the structure. In competition, the height of the A-frame is typically set at approximately 6 feet, 2 inches.

The dog walk is made up of three narrow planks typically joined by hinges. The planks are typically 12" wide and 12 feet long. The middle plank is positioned parallel with the ground by a pair of adjustable bases and the other planks operate as entrance or exit ramps. The height of the middle plank is typically set 4 feet above the ground. In competition, the length of the dog walk is just under 30 feet.

Agility rings are appropriately sized to accommodate both of these structures. Homeowners wishing to train their own dogs often do not have enough space for both structures. What is needed is a structure that safely combines features from both the A-frame and the dog walk in a smaller area.

BRIEF SUMMARY OF THE INVENTION

It is an object of the present invention to provide a canine training device including a first surface having a pair of generally parallel sides spaced by a first predetermined distance and a second surface having a first region having generally parallel sides spaced by a second predetermined distance and a second region having a first dimension generally corresponding to the first predetermined distance and second dimension generally corresponding to the second predetermined distance, the first surface being coupleable to the second surface.

It is another object of the present invention to provide a canine training device including a first planar structure coupled to a second planar structure at a hingeable joint, the structures forming a generally triangular structure when supported by a support surface. The first structure having a pair of generally parallel sides spaced by a first predetermined distance and the second structure having a first region having generally parallel sides spaced by a second predetermined distance and a second region having a first dimension generally corresponding to the first predetermined distance and a second dimension generally corresponding to the second predetermined distance.

It is another object of the present invention to provide a canine training device including a first planar structure and a second planar structure. The first and second structures coupleable at a hingeable joint. The first structure having a pair of generally parallel sides spaced by a first predetermined distance, the second structure having a first region having generally parallel sides spaced by a second predetermined distance and a second region having a first dimension generally corresponding to the first predetermined distance and a second dimension generally corresponding to the second predetermined distance.

BRIEF DESCRIPTION OF THE DRAWINGS

Other objects, features, and advantages of the present invention will be apparent in the following detailed description thereof when read in conjunction with the appended drawings wherein the same reference numerals denote the same or similar parts throughout the several views, and wherein.

DETAILED DESCRIPTION OF THE INVENTION

Figure 1:
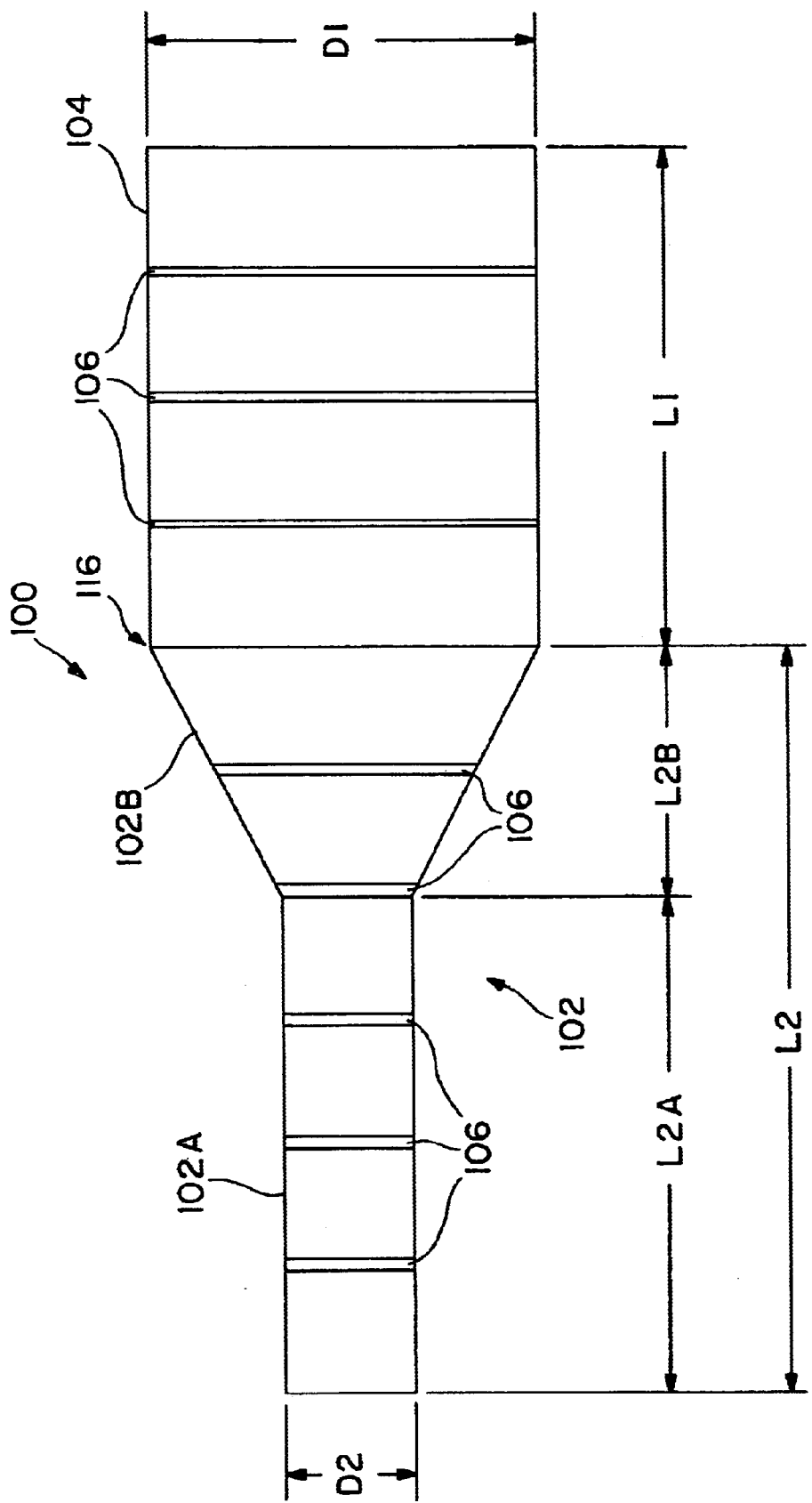
FIG. 1 is a plan view of an exemplary structure consistent with the present invention.

FIG. 1 shows a plan view of a canine training structure 100. The device 100 may include a first surface 104 having a pair of generally parallel sides spaced by a first predetermined distance D1 and a second surface 102 having a first region 102A having generally parallel sides spaced by a second predetermined distance D2 and a second region 102B having a first dimension generally corresponding to the first predetermined distance D1 and a second dimension generally corresponding to the second predetermined distance D2. In a preferred embodiment, the first surface 104 has a length L1 of 4 feet and a first predetermined distance D1 of 3 feet, the first region 102A of the second surface 102 has a length L2A of 4 feet and a second predetermined distance D2 of 1 foot, and the second region 102B of the second surface 102 has a length L2B of 2 feet. The second region 102B maybe referred to as a transition region, where the width of the structure transitions from a wide width to a narrow width or vice versa depending on which end of the structure the canine enters. The surfaces 102 and 104 may include a plurality of protuberances or raised slats 106, preferably three-fourths of an inch thick and one-and-half inches wide that preferably extend from edge to edge of the surfaces. The slats 106 may be equally spaced on the surfaces, preferably spaced approximately 12" apart. The slats 106 may provide a pushing surface to aid the canine in the ascent or decline of the structure 100. The transition in the dimension of the second region 102B from D1 to D2 may be linear or non linear.

The surface 102 and 104 may be made from wood, preferably fir plywood or aluminum. The surfaces may have a textured coating to reduce injury to a canine.

Figure 2:
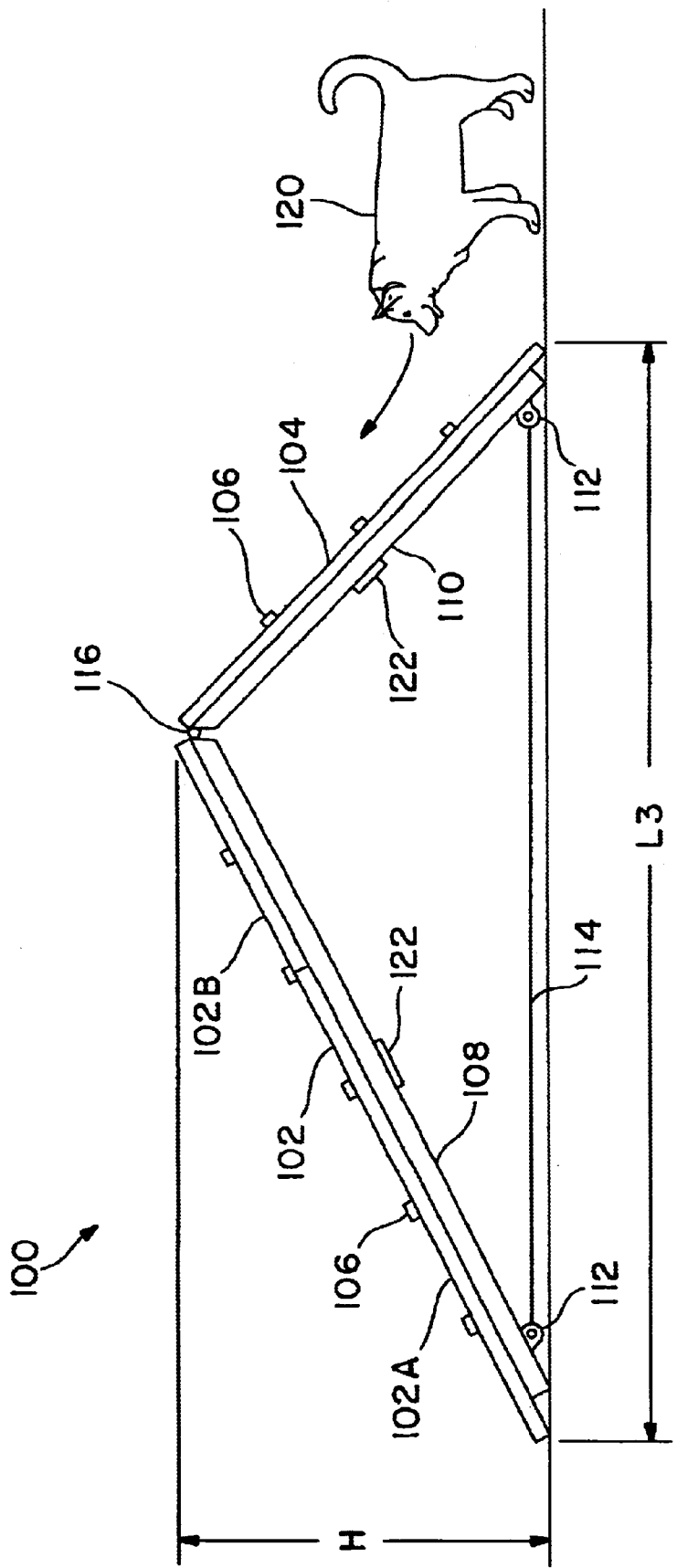
FIG. 2 is a side-view of the structure of FIG. 1.

As shown in FIG. 2, appropriate structural members 108 and 110 may support the surfaces 102 and 104 respectively. The structure 100 may rest on a support surface, for example the ground or an indoor floor. The structural members 108 and 110 may be formed from wood or metallic tubing, for example hollow aluminum or steel tube stock. The tube stock may be joined using mechanical fastener or may be joined, for example by welding. The surfaces 102 and 104 or the structural member 108 and 110 may be coupled by a hinge 116. The hinge may be mechanically fastened to the surfaces 102 and 104 or the structural members 108 and 110. The hinge 116 may be a piano hinge that preferably extends from edge to edge of the structure. The hinge 116 may include a removable hinge pin to allow for easier transport. The hinge may be positioned to allow the structure to lie flat on a surface. Handles 122 may be added to the structure to aid in transportation, preferably, the handles are located on the under surface of the structure.

The structure 100 may include a tensioning device 114 coupled to opposing end of the surfaces 102 and 104 or the structural members 108 and 110 to form the structure into a triangular shape. The tensioning device may be a length of chain or cable. The length of the tensioning device may be adjusted to change the overall height H of the structure 100 at its peak. To begin training a canine the structure may be laid flat on a surface. As the canine develops confidence, the overall height H of the structure may be increased by decreasing the length of the tensioning device 114. In a preferred embodiment, an interior angle formed between the first surface and the second surface is preferably an obtuse angle, and more preferably is approximately 110. In this preferred configuration, the height H of the structure 100 is approximately 2 feet 8 inches. The tensioning device may be coupled to the surfaces 102 and 104 or the structural member 108 and 110 with an eyehook 112.

The canine 120 may enter the structure 100 from either end. The canine climbs the entrance surface and then descends the exit surface. When the canine enters the structure as shown in FIG. 2, the second region 102B allows the canine to redirect his travel towards the narrower first region 102A. If the structure did not transition from one width to another, a canine entering the structure as shown in FIG. 2 accidentally could fall off the structure and be injured.

Figure 3:
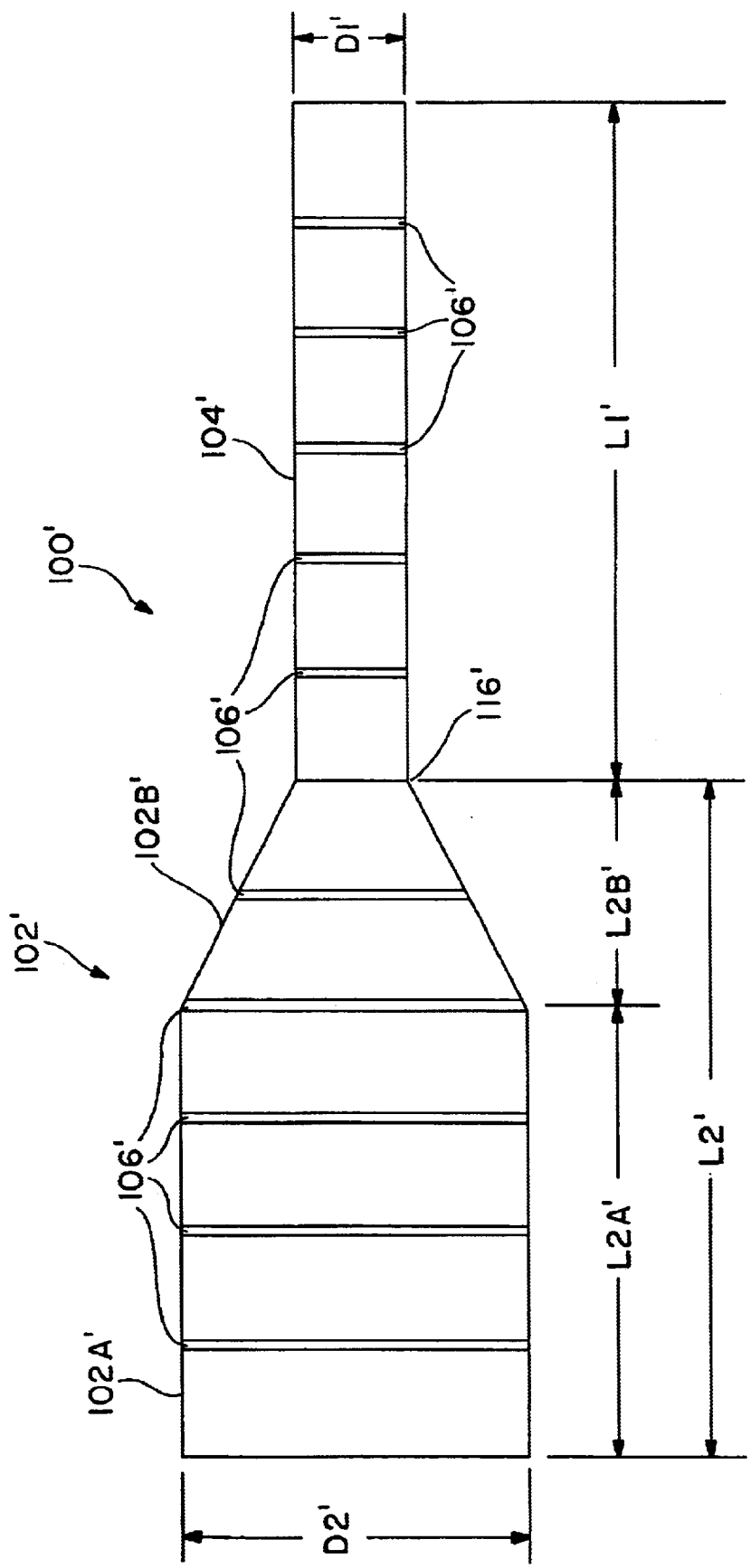
FIG. 3 is a plan view of another exemplary structure consistent with the present invention.

FIG. 3 shows a plan view of another canine training structure 100'. The device 100' may include a first surface 104' having a pair of generally parallel sides spaced by a first predetermined distance D1' and a second surface 102' having a first region 102A' having generally parallel sides spaced by a second predetermined distance D2' and a second region 102B' having a first dimension generally corresponding to the first predetermined distance D1' and a second dimension generally corresponding to the second predetermined distance D2'. In a preferred embodiment, the first surface 104' has a length L1' of 6 feet and a first predetermined distance D1' of 1 foot, the first region 102A' of the second surface 102' has a length L2A' of 4 feet and a second predetermined distance D2' of 3 feet, and the second region 102B' of the second surface 102 has a length L2B' of 2 feet. The second region 102B' maybe referred to as a transition region, where the width of the structure transitions from a wide width to a narrow width or vice versa depending on which end of the structure the canine enters. The surfaces 102' and 104' may include a plurality of protuberances or raised slats 106', preferably three-fourths of an inch thick and one-and-half inches wide that preferably extend from edge to edge of the surfaces. The slats 106' may be equally spaced on the surfaces, preferably spaced approximately 12" apart. The slats 106' may provide a pushing surface to aid the canine in the ascent or decline of the structure 100'. The transition in the dimension of the second region 102B' from D1 to D2 may be linear or non linear. A hingeble joint 116' may couple the first surface 104' and the second surface 102'. Suitable structural members may be used to support the first and second surfaces 104' and 102' respectively. A tensioning device coupled to the first and second surfaces may also be used to form the structure into a triangular shape. The length of the tensioning device may be adjusted to change the overall height of the structure at its peak.

The dimensions given are exemplary and should not be construed as the only dimensions possible. These dimensions can be changed without departing from the present invention.

It should be understood that, while the present invention has been described in detail herein, the invention can be embodied otherwise without departing from the principles thereof, and such other embodiments are meant to come within the scope of the present invention as defined in the following claim(s).

We claim:

1. A canine training device, comprising:
 a first region having a pair of generally parallel sides spaced by a first predetermined distance;
 a second region having generally parallel sides spaced by a second predetermined distance, the second predetermined distance being less than the first predetermined distance; and
 a transition region reducing in width from a first end having a first width generally corresponding to the first predetermined distance to a second end having a second width generally corresponding to the second predetermined distance, the transition region having a length from the first end to the second end greater than the second predetermined distance.

2. The canine training device of claim 1, wherein a transition from the first distance to the second distance is linear.

3. The canine training device of claim 1, further comprising a structure for supporting the first and second regions.

4. The canine training device of claim 3, further comprising a tensioning device coupled to the structure for maintaining the first and second regions in an inclined position.

5. The canine training device of claim 4, wherein the first and second regions form an obtuse angle.

6. The canine training device of claim 1, wherein the first and second regions are planar.

7. The canine training device of claim 1, wherein the first region has a first end and a second end and the second region has a first end and a second end, the first end of the first region for contacting a support surface and the second end of the second region for contacting the support surface, the second end of the of the first region coupled to the first end of the transition region at a hingeable joint and the first end of the second region coupled to the second end of the transition region.

8. The canine training device of claim 1, wherein the first region has a first end and a second end and the second region has a first end and a second end, the first end of the first region for contacting a support surface and the second end of the second region for contacting the support surface, the second end of the of the first region coupled to the first end of the transition region and the first end of the second region coupled to the second end of the transition region at a hingeable joint.

9. The canine training device of claim 1, wherein the transition region is disposed between the first region and the second region.

10. The canine training device of claim 1, wherein the first region further comprises a plurality of protuberances disposed generally orthogonal to an edge of the first region.

11. A canine training device, comprising:

a first planar structure coupled to a second planar structure at a hingeable joint, the structures forming a generally triangular structure when supported by a support surface, the first structure having a pair of generally parallel sides spaced by a first predetermined distance, and the second structure having a first region having generally parallel sides spaced by a second predetermined distance, the second predetermined distance being less than the first predetermined distance, and a transition region, the transition region reducing in width from a first end having a first width generally corresponding to the first predetermined distance to a second end having a second width generally corresponding to the second predetermined distance, the transition region having a length from the first end to the second end greater than the second predetermined distance.

12. The canine training device of claim 11, wherein the first structure has a surface comprising a plurality of protuberances disposed generally orthogonal to an edge of the surface.

13. The canine training device of claim 11, wherein a transition from the first predetermined distance to the second predetermined distance is linear.

14. The canine training device of claim 11, further comprising a tensioning device coupled to the first structure and the second structures for maintaining the first and second structures in an inclined position.

15. The canine training device of claim 11, wherein the transition region is disposed between the first structure and the first region of the second structure.

16. A canine training device, comprising:

a first planar structure;

a second planar structure; and a hingeable joint coupled between the first planar structure and the second planar structure, wherein the first structure has a pair of generally parallel sides spaced by a first predetermined distance, and wherein the second structure has a first region having generally parallel sides spaced by a second predetermined distance and a trapezoidal region, the trapezoidal region having a first end having a first width generally corresponding to the first predetermined distance and a second end having a second width generally corresponding to the second predetermined distance, the trapezoidal region having a length from the first end to-the second end greater than the second predetermined distance.

17. The canine training device of claim 16, wherein the first structure has a surface comprising a plurality of protuberances disposed generally orthogonal to an edge of the surface.

18. The canine training device of claim 16, wherein the trapezoidal region is disposed between the first region of the second structure and the first structure.

19. The canine training device of claim 16, wherein a transition from the first predetermined distance to the second predetermined distance is linear.

20. The canine training device of claim 16, further comprising a tensioning device coupled to the first and the second structures for maintaining the first and second structures in an inclined position.

* * * * *